United States Patent [19]
Hopkins, II

[11] Patent Number: 5,644,396
[45] Date of Patent: Jul. 1, 1997

[54] SPECTROGRAPH WITH LOW FOCAL RATIO

[75] Inventor: George W. Hopkins, II, Sunnyvale, Calif.

[73] Assignee: Hewlett-Packard Company, Palo Alto, Calif.

[21] Appl. No.: 492,661

[22] Filed: Jun. 20, 1995

[51] Int. Cl.[6] .................................. G01J 3/18; G01J 3/44
[52] U.S. Cl. ........................ 356/301; 356/305; 356/328
[58] Field of Search ...................................... 356/301, 326, 356/328, 305, 331, 334

[56] References Cited

U.S. PATENT DOCUMENTS

| | | | |
|---|---|---|---|
| 3,628,849 | 12/1971 | Flamand et al. | |
| 3,930,728 | 1/1976 | Pieuchard et al. | |
| 4,027,952 | 6/1977 | Hugues. | |
| 4,087,183 | 5/1978 | Passereau. | |
| 4,743,112 | 5/1988 | Burke | 356/326 |
| 4,770,512 | 9/1988 | Ikari. | |
| 4,850,706 | 7/1989 | Mikes | 356/328 |
| 4,895,445 | 1/1990 | Granger | 356/328 |
| 4,961,625 | 10/1990 | Wood et al. | |
| 5,052,766 | 10/1991 | Noda et al. | 359/15 |
| 5,071,250 | 12/1991 | McGee | 356/328 |
| 5,155,616 | 10/1992 | Yamaguchi et al. | 359/216 |
| 5,329,353 | 7/1994 | Ichimura et al. | 356/328 |

FOREIGN PATENT DOCUMENTS

0436181A1  7/1991  European Pat. Off. .

OTHER PUBLICATIONS

Barnard, Thomas W., et al., Anal. Chem. 1993, vol. 65, pp. 1225–1230.
Datta, Sunil K., Indian Journal of Pure & Applied Physics, vol. 22, Nov. 1984, pp. 667–669.
Forbes, G. W., Optical Society of America, vol. 5, (#11), Nov. 1988, pp. 1943–1956.
Kingslake, R., Academic Press, vol. 5, New York & London 1969, pp. 20–21.
Kingslake, R., Academic Press, New York, San Francisco, London 1978, pp. 112–113, 54, 347–356.

*Primary Examiner*—F. L. Evans

[57] ABSTRACT

A spectrograph having a collimating lens unit, a reflective diffraction grating, a focusing lens unit, and a light detector is provided. The collimating lens unit has at least one optical element with at least one aspheric surface for collimating light from a light source. This lens unit has a positive optical power and a focal ratio of at most 1.7. The reflective diffraction grating diffracts the collimated light from the collimating lens unit. The focusing lens unit also has at least one lens with at least one aspheric surface. It focuses the first order diffracted light on the light detector and has a focal length that provides an overall magnification of 0.8 to 2.0 when combined with the collimating lens unit and the diffraction grating.

19 Claims, 7 Drawing Sheets

SPECTROGRAPH WITH LOW FOCAL RATIO

FIELD OF THE INVENTION

This invention is related to optical spectrographs. More specifically, this invention is related to spectrographs with low focal ratios, thereby resulting in improved light collection capability.

BACKGROUND

A spectrograph is a device for separating electromagnetic radiation of very short wavelengths (including visual light) into its spectral components. Optical spectrographs are used for chemical analysis, with applications in industry, medicine and science.

Spectrographs contain dispersive elements, such as prisms and diffraction gratings. Generally, modern spectrographs use diffraction gratings to analyze light. Spectrographs, to work efficiently, also contain optical elements to collect light for the prism or diffraction grating and to concentrate light onto a detector. A slit may be included to block light of unwanted wavelengths from the detector.

A common form of a spectrograph has a combination of prisms or a planar diffraction grating with optics for collecting and focusing light. The optics form the light into a mostly parallel beam to impinge onto a dispersive element. Separate optics are used for focusing light onto a slit or detector after dispersion by the prism or grating. Such optics may consist of mirrors, lenses or a combination of mirrors and lenses and may be used with entrance and exit slits as a monochromator or with a movable or array detector as a spectrograph. When a single mirror or a simple lens with spherical surfaces is used for collecting light, and a similar optical element is used for focusing light onto a slit or detector, a typical focal ratio is f/3.5. A focal ratio or f-number (represented by f/#, in which # shows a ratio) is the ratio of the distance between the source and the entrance pupil (aperture) to the diameter of the entrance pupil. A smaller focal ratio indicates better light-collecting ability.

Some spectrographs combine the functions of light collection, dispersion and concentration in a concave diffraction grating. The use of diffraction gratings in such spectral analyses began in the Eighteenth Century. The early gratings were planar, due to the difficulty of ruling concave gratings. Such gratings were used with a pair of telescopes, one for collimating light and one for viewing (early spectrographs required visual matching of spectra).

Concave diffraction gratings became popular after the invention of holographically-recorded diffraction gratings. Concave diffraction gratings are described in, for example, U.S. Pat. Nos. 3,628,849; 3,930,728; and 5,052,766.

Concave gratings, although capable of the combined function of collecting, dispersing and concentrating light, have certain limitations. The solid angle of light that can be collected by such gratings is relatively small. It is difficult to record gratings with a small focal ratio. For a concave grating, the focal ratio corresponds to the ratio of the distance from the source to the concave grating divided by the diameter of the light impinging of the concave grating. A smaller f/# indicates greater light collection capability. Most concave gratings handle a light cone with a focal ratio of about f/3. Even the "fastest" (i.e., with the smallest focal ratio to have the best light collection capability) gratings have a focal ratio of approximately f/2.

During manufacture of concave holographic gratings, the choice of recording beam parameters provides certain degrees of freedom for correcting aberrations in the image of the source at the detector. These degrees of freedom include recording wavelength, location of recording points, an aspheric surface on the grating blank and aberrations introduced into the recording beams. Using aspheric lenses is advantageous over using aspheric concave gratings. The concave grating surface and recorded hologram are coincident, which reduces the ability to use the aforementioned parameters for aberration correction. Since these degrees of freedom are limited, there are resulting residual aberrations. The magnitude of these aberrations increases with decreasing focal ratios, resulting in a limitation on the minimum focal ratio. The wide spread in angle of incidence for light onto a concave grating with a low focal ratio causes variation in diffraction efficiency, imposing an additional limitation on the minimum focal ratio.

Many spectroscopic measurements are made with weak signals. Therefore, to achieve good analysis, it is desirable to collect as many photons as possible. In certain spectral regions, and in all spectral regions for very weak signals, the measurement will be limited by noise generated in the detector. For these reasons, it is preferred to collect light from as large a solid angle as possible and to transfer this light onto as small a detector as possible. Since the product of the area of a source and the solid angle of the collected light remains constant within an optical system, to use a small detector, a large solid angle of light must not only be collected but also focused onto the detector. In addition, aberrations must be low to result in high image quality at the detector.

The light collection capability of mirrors is typically f/6.7, for example, as in the Perkin-Elmer ICP-OES spectrograph (see Barnard, Thomas, et. al., *Anal. Chem.* 65, 1225 (1993)) input optics. For typical fast mirror systems (e.g., Jobin-Yvon H-10, Jarrell-Ashe Model 82-410), the focal ratio is about f/3.5. Lenses for light collection and focusing are capable of smaller focal ratios than are mirrors. The Datta collection lens (see Datta, Sunil, *Indian Journal of Pure and Applied Physics* 22, 667 (1984)), a cemented two-element lens, has a focal ratio of f/3.65. The greatest collection capability in current commercial instrumentation, obtained with multi-element lenses in Kaiser Optical Systems Holo-Spec f/1.8i VPT SYSTEM, is f/1.8. Simple, single-element collecting and camera lenses are described by Eastman Kodak Company (see. U.S. Pat. No. 4,895,445 issued to Granger). The focal ratios in the Granger patent, determined from the scale of the drawings, appear to be relatively large.

Improvement in the optics for collecting light in a spectrometer can be found in the literature. U.S. Pat. No. 5,011,284 (Tedesco et. al.) discloses the use of an aspheric lens for collecting Raman scattered light for diffraction by transmission gratings on a prism. However, transmission gratings are relatively complex. Also, in the device of Tedesco et al. a relatively large light detector is still needed.

High image quality requires maintaining the specificity of light at different wavelengths and a high ratio of signal to noise by concentrating light onto a small detector because a large detector results in more noise. Prior art spectrographs use relatively complex optical system and yet have relatively large focal ratios. What is needed is a spectrograph with relatively simple optical elements, having a small focal ratio, and capable of focusing light of different wavelengths onto a relatively small detector.

SUMMARY

The present invention provides a spectrograph having a collimating lens unit, a reflective diffraction grating, a focusing lens unit, and a light detector. The collimating lens unit has at least one optical element with at least one aspheric surface for collimating light from a light source. This lens unit has a positive optical power and a focal ratio of at most 1.7. The diffraction grating diffracts the collimated light from the collimating lens unit. The second lens unit also has at least one optical element with at least one aspheric surface. It focuses the diffracted light on the light detector and has a focal length that provides an overall magnification of 0.8 to 2.0 when combined with the collimating lens unit and the diffraction grating.

The present invention also provides a method of analyzing light from a light source. The method contains the steps of collimating light from the light source onto a diffraction grating, diffracting the collimated light from the first lens unit with the diffraction grating, and focusing the diffracted light from the diffraction grating with a second lens unit to a light detector. The first lens unit has a focal ratio of at most 1.7. Each of the first lens unit and the second lens unit has at least one lens with at least one aspheric surface. The second lens unit has a focal length that provides an overall magnification of 0.8 to 2.0 when combined with the first lens unit and the diffraction grating.

Also provided in the present invention is a method of making a spectrograph for analyzing light from a light source. The method includes, not necessarily in order, the steps of mounting on a support a collimating lens unit, a planar diffraction grating, a focusing lens unit, and a light detector. The collimating lens unit has a focal ratio of 1.7 or less and is mounted in a position relative to the light source such that light emitted from the light source is collimated to a generally parallel beam. This lens unit has at least one lens with at least one aspheric surface. The planar diffraction grating is mounted in a position to diffract the collimated light beam such that the first order diffracted light forms an acute angle with the collimated beam. The focusing lens unit is mounted in a position to focus the first order diffracted light to the light detector. The planar light detector is mounted in a position such that the normal of the plane of the light detector forms an acute angle with the optical axis of the focusing lens to obtain distinct, compact images of the light source in selected different wavelengths on the light detector.

The spectrograph of the present invention, using simple optical elements, has a smaller focal ratio and better light collection ability than prior art spectrographs, thereby producing higher quality imaging. This increase in light collection ability is made possible by the use of single optical elements for the collimator and camera (i.e., focusing) units, although multiple lenses in each lens unit can be used. Each lens unit has at least one aspheric optical surface. The aspheric surfaces correct spherical aberration and other aberrations such as astigmatism and oblique spherical aberration. The use of single elements greatly simplifies the construction and alignment processes. Generally, the use of single element lenses would result in chromatic aberration. In prior art systems (e.g., the detector in the Holo-Spec f/1.8i spectrograph with multi-element lenses, supra), the compound camera lens is corrected for chromatic aberration by the use of glasses with differing dispersions. According to the present invention, in a preferred embodiment, the chromatic aberration can be compensated by tilting the detector plane, allowing the advantageous use of the single element lenses without the need for complex and expensive optics.

The use of aspheric lenses (with at least one aspheric surface on each) for collimating light onto a diffraction grating and for focusing the diffracted light to a detector enables the images of different wavelengths to be focused onto a small detector. Using such aspheric lenses for collecting the diffracted light enables the use of planar diffraction gratings. The first aspheric lens corrects the spherical aberration which would normally result from using a spheric lens for collimating light. The second aspheric lens compensates for aberrations that would normally result from a spheric lens collecting light diffracted from the planar diffraction gratings at an angle. The second aspheric lens is separated from the diffraction grating by a distance which results in diffracted light of different wavelength striking widely separated portions of the second lens. This wide separation enables use of a more general form of aspheric surface to correct astigmatism and oblique spherical aberration in addition to spherical aberration.

This configuration is advantageous because when light is incident as a parallel beam onto a planar diffraction grating with parallel grooves, there are no aberrations introduced by the planar gratings. The only effect on imagery is a magnification that is in the inverse ratio of the cross sections of the incident and diffracted beams. The lenses do not need to correct grating aberrations. Diffraction efficiency is a function of the angle of incidence of light. Planar diffraction gratings, unlike concave diffractions, do not have a wide range of angles of incidence, and therefore do not compromise diffraction efficiency for small focal ratio spectrographs.

The spectrograph of the present invention can be used for analyzing light from weak sources, such as fluorescence, phosphorescence, Raman scattering or emission. It collects light over a large solid angle, disperses this light and focuses it onto a detector, again from a large solid angle. The small focal ratio of the second lens unit enables the use of small detectors, which take up less space and are easier to manufacture than larger ones. With such advantages, the present invention is especially applicable when light from a weak source is emitted at wavelengths which are transmitted by available optical materials. Applications are found, for example, in analyzing spectra in analytical chemistry, clinical chemistry, process monitoring, and medical diagnostics.

BRIEF DESCRIPTION OF THE DRAWINGS

The following figures which show the embodiments of the present invention are included to better illustrate the spectrograph of the present invention. In these figures, wherein like numerals represent like features in the several views and structures are not shown in scale.

DETAILED DESCRIPTION OF THE INVENTION

Figure 1:
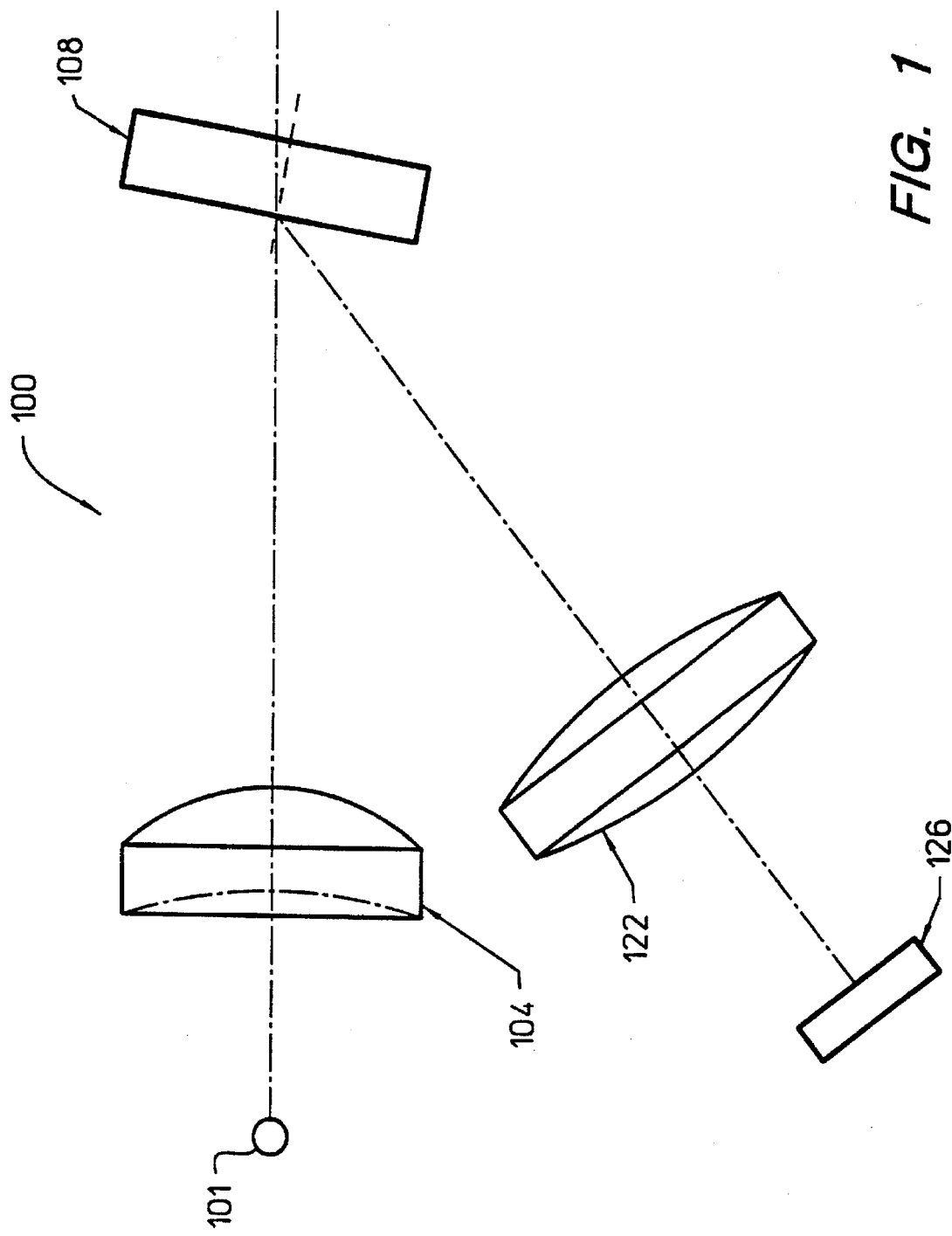
FIG. 1 shows a schematic representation of an embodiment of the spectrograph of the present invention.

An embodiment of the spectrograph of the present invention is depicted in FIG. 1. The spectrograph 100 has a light source 101. This light source can be a slit or a light emitting sample (e.g., a fluorescence, phosphorescence, Raman scattered light). Light from the light source is collimated by the collimator lens unit 104, which can be a single lens or a group of lenses, for the central wavelength (e.g., 670 nm). This lens unit has at least one aspheric (aspherical) surface on at least one of the lens therein. The beam of light from the collimating lens unit is incident on a planar (or plane) diffraction grating 108. As used herein, the term "planar" or "plane" when related to a diffraction grating or the surface of a light detector, refers to the overall appearance of the diffraction grating or the detector, thus disregarding the microscopic nonplanar structures of the grooves on the grating or the pixel arrays of the detector. On the diffraction grating 108, light is dispersed (i.e., diffracted) according to its wavelength. The diffracted light is incident on the camera lens unit (or focusing lens unit) 122. The focusing lens unit focuses the light of all wavelengths, forming images of the light source, one for each wavelength, on the detector 126.

Figure 2:
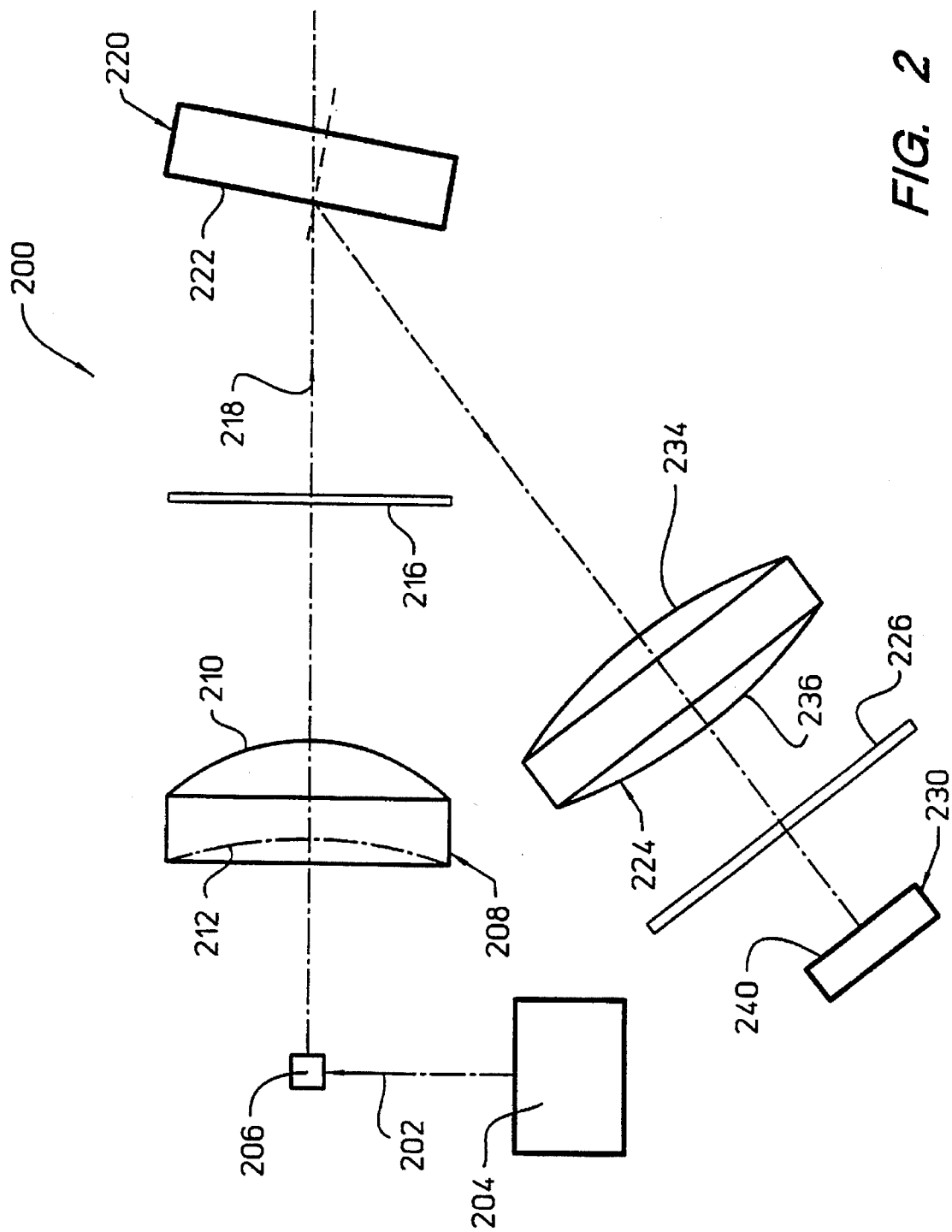
FIG. 2 shows a schematic representation of an embodiment of the spectrograph of the present invention used in analyzing Raman scattered radiation.

As an illustration, an embodiment of a spectrograph for analyzing Raman scattered light is shown in FIG. 2. This spectrograph 200 is constructed such that it is suitable for detecting light of wavelengths of about 675 nm to 855 nm. It is to be understood that by modifying, for example, the diffraction grating configuration and the aspheric surfaces of lenses, one skilled in the art will be able to construct spectrographs suitable for application in a different wavelength range. In this preferred embodiment, a laser beam 202 of 670 nm from a laser 204 is used to illuminate an analytical sample 206 in a container (or analytical cell), which is not shown in the drawing. As a result, the sample 206 emits Raman scattering light and acts as a light source.

The light coming from the light source (i.e., sample 206) is incident on a lens 208 having positive optical power. This lens 208 has an aspheric surface 210 facing away from the light source and a spheric (or spherical) surface 212 facing the incoming light. Surface 210 is ellipsoidal, although a general aspheric surface (i.e., nonellipsoidal, nonhyperboloidal, nonparaboloidal) can also be used. Because a general aspheric surface is harder to make and offers no additional advantage before the light is diffracted, it is not preferred over an ellipsoidal surface. The lens 208 collimates the light from the light source 206 such that the collimated light is a substantially parallel beam for a wavelength of 765 nm. Thus, the collimating lens collects light emitting from the light source to form a beam. Preferably, the lens 208 has an ellipsoidal surface facing in the direction of the collimated light so that a large portion of the lens can be used for collecting light and collimating light in a symmetrical manner about the center of the lens.

The lens 208 is preferably made of glass, although other appropriate substances known in the art for making lenses can be used. Compression molding is the preferred method of making the aspheric surface 212. The spheric surface 212 can also be made by molding, although conventional processes of grinding and polishing can be used as well. Because of the finite thickness of the optical element (i.e., the lens), using a lens with two aspheric surfaces can provide additional aberration correction. However, such lenses with two aspheric surfaces are harder to make. The lens 208 can also be, but not necessarily, coated with an antireflection coating with a V minimum at the excitation wavelength so that the Raman scattered light is transmitted therethrough. Such aspheric lenses (i.e., lenses that have at least one aspheric surface each) can be obtained from commercial sources (e.g., Optische Werke G. Rodenstock of München, Federal Republic of Germany).

To reduce unwanted light (e.g., the excitation wavelength) in the collimated beam, a Rayleigh blocking filter 216 can be used to reflect light of the excitation wavelength (i.e., 665 nm in this embodiment) and transmit Raman scattered light. The collimated beam has a generally disk-shaped profile (the beam having an axis shown by 218). It is preferred that the lens 208 and the light source 206 be configured so that the focal ratio (the focal length of the lens divided by the diameter of the beam) is 1.7 or less, more preferably from about 1.0 to about 1.7, and even more preferably, because of the ease of manufacture and configuration, from 1.2 to 1.7. If less resolution (e.g., less than 40 resolution elements for a 8.8 mm wide detector) is required, a focal ratio smaller than 1 may be used (e.g., 0.8 for 20 resolution elements for a 8.8 mm wide detector). In a preferred embodiment of FIG. 2, the focal ratio of lens 208 is f/1.2, corresponding to an increase in light collecting capability of 2.25 times over a prior art device of f/1.8.

Light from the extremes of the spectrum is approximately collimated, but diverges and converges slightly due to uncompensated dispersion of the lens material. The collimated light is directed to fall on a planar diffraction grating system 220. In this preferred embodiment, the grating system covers a linear field of 8.8 mm with 1200 grooves per min. In FIG. 2, the grooves are located on the surface 222 and are parallel in a direction into the drawing. A grating with a blaze wavelength near 750 nm is preferred. Blazing means that the grating has a sawtooth profile. The blaze wavelength is the wavelength for which the angle of incidence is equal to the angle of diffraction, relative to the surface normal to the large facet of the sawtooth profile. This diffraction grating is a square reflection grating. Thus, it diffracts light efficiently for different wavelengths centering around 750 nm. The design and fabrication of planar diffraction gratings for light of specific wavelengths are known in the art. It is understood that gratings with grooves of other profiles (e.g., squarewave, sinewave, etc.) can be used.

In the preferred embodiment, the planar grating system 220 is arranged such that its first order diffracted light forms an angle of about 40° with the collimated beam. This arrangement permits the lenses and the grating system of the spectrograph to be positioned appropriately without interfering with one another. It is understood that the planar grating system can be positioned to diffract the collimated light at an angle different from 40° as long as the first order diffracted light can be adequately focused by a lens system to a detector.

The first order diffracted light (which is diffracted by the grating surface and does not transmit through the diffracting grating system) is incident on the camera lens (or focusing lens) 224. Generally, the optical axis of the lens 224 coincides with the center line of the beam of first order diffracted light for a wavelength which results in equal amounts of spectra on the detector on either side of this wavelength. The focusing lens 224 focuses the light of all wavelengths to pass through an optional planar-parallel window 226 and forms images of the light source, one for each wavelength, on a detector 230. The planar-parallel window 226 serves to protect the detector 230. The focusing lens 224, like the collimating lens 208, is an aspheric lens in that it has at least one aspheric surface. In this preferred embodiment, the focusing lens 224 has an aspheric surface 234 and a spheric surface 236. The focusing lens 224, like the collimating lens 208, can be coated with an antireflection coating if desired. When only one aspheric surface per lens is used, it is preferred that the aspheric surface of each lens faces the diffraction grating. The focal length of this focusing lens 224 is selected such that when combined with the collimating lens 208, when the first order diffracted light is focused on the light detector 230, the resulting images (from different wavelengths) have magnifications of about 0.8 to about 2.0 (i.e., have images of 0.8 to 2.0 times the size of the light source) in the dimension generally perpendicular to both the diffracted light beam and the grooves of the diffraction grating. It is contemplated that images of wavelengths of interest from about 180 nm to 2500 nm can be detected. The optical material for the lenses can be selected depending on the application.

When the collimated light beam is diffracted by the planar diffraction grating, the first order diffracted light is also in the form of a collimated beam. However, the first order diffracted light beam coming off the diffraction grating has a smaller cross section than the collimated beam impinging it. Because in this embodiment, the planar diffraction grating diffracts light in a direction perpendicular to the grooves and the angles of incidence and diffraction are not equal, the diffracted beam has a generally "squashed," i.e., generally elliptical, cross section. The aspheric focusing lens 224 preferably has a nonellipsoidal, nonhyperboloidal, and nonparaboloidal surface for correcting aberration. The light of various wavelengths in a spectrum of interest are distributed asymmetrically about the center of the aspheric lens 224. Thus, the first order diffracted light is focused in an asymmetrical manner about the center of the aspheric lens by such an aspheric lens to a detector.

In the present invention, because such an aspheric, nonellipsoidal, nonhyperboloidal, nonparaboloidal lens can correct abberation, using an aspheric lens enables a wider angle of incident light, thereby leading to a smaller focal ratio than otherwise. If a lens with spheric surfaces is used to focus the first order diffracted light onto the detector, a large focal ratio is necessary to reduce aberrations to an acceptable level. The large focal ratio means that a magnified image is received by the detector, which must be large enough to capture this image. By using an aspheric lens, spherical aberration can be corrected. The magnification is reduced and a smaller detector can be used for receiving the image, thereby reducing the noise generated in the detector. Smaller detectors are easier to manufacture, less bulky, and less expensive.

If the aspheric lens is separated from the diffraction grating by a distance sufficient to spread light of different wavelengths across the lens, additional aberrations, such as astigmatism and oblique spherical aberration can be corrected. A small focal ratio and small detector can be used for an extended wavelength range. If the aspheric lens is too close to the diffraction grating, the light of different wavelengths cannot be separated adequately on the lens to be effectively corrected by the aspheric surface of the lens because of limited space available. Of course, if the aspheric lens is too far from the diffraction grating, the lens will be large and difficult to manufacture. Preferably, the distance between the lens surface facing the diffraction grating and the grating is sufficient to result in a spread of the light of the extreme wavelengths around the central wavelength to a size about 1.5 to 3 times, more preferably about 2 times, the size of the central wavelength light beam off the grating. In other words, if the apparatus is used for analyzing spectra having a plurality of wavelengths of interest, the diffraction grating is separated from the focusing lens by a distance sufficient for the envelope of light of interest (with the shortest and the longest wavelengths) to be spread so that the light beam in its narrow dimension, when impinging on the focusing lens, has a size of 1.5 to 3 times, more preferably about 1.5 to 2 times, even more preferably about 2 times, the narrow dimension of the central wavelength light beam coming off the grating. In FIG. 1 and FIG. 2, the narrow dimension is in the plane of the figure and the wider dimension is perpendicular to the plane of the figure.

The detector 230 is a CCD detector (Charge Coupled Device), which has an array of detecting units, or pixels arranged in a substantially flat (or planar) configuration. Such detectors are known in the art. The receiving surface 240 of the CCD detector is tilted to form a slight, acute angle with a plane that is perpendicular to the general optical axis of the focusing lens 224 so that the light of different wavelengths will be focused onto the surface 240 to form distinct, relatively compact images thereon. In other words, the normal to the detector forms an angle with the optical axis of the focusing lens 224. This tilting of the detector 230 is done to correct the chromatic aberration due to the difference in wavelengths of the light being focused. A person skilled in the art, based on the present disclosure, will be able to adjust the tilt angle until satisfactorily distinct, compact images are obtained overall. Depending on the quality of the images of the particular wavelengths desired, the tilt angle can be adjusted accordingly. Preferably, the tilt angle is about 0° to 2°, more preferably about 1.5°.

The elements of the spectrograph are arranged with one another and the light source to obtain the most desired images on the detector. Preferably, the collimating lens 208 does not make the collected light strictly parallel, but is arranged such that its profile, in combination with the profile of the focusing lens 224 which focuses light onto the detector, provides improved imagery over the entire array detector. The concentration of light at the center of the detector is degraded a little, to permit improved concentration of light at the extremes of the array detector. With the present invention, by using aspheric lenses, a planar diffraction grating, and a slightly tilted planar array detector, sufficiently spatially separated, distinct, and compact images can be formed on the detector for a focal ratio of f/1.0 to f/1.7, even as small as f/1.0. The images of a point source of light, measured along the detector in the plane containing the axes of the two lenses, is approximately 0.05 mm for all wavelengths. As a result of the magnification of the grating, and, to a lesser extent, the typical 0.05 mm of spreading due to aberration of a point source, the images of a 0.094 mm wide slit, at the detector, vary from a full width at half maximum of 0.117 mm at 0.675 microns to 0.173 mm at 0.855 microns wavelengths. For a 8.8 mm wide detector, this would correspond to about 60 spectral resolution elements or 1.5 times the number (i.e., 40) required to be considered good resolution. Spectral resolution reflects a condition that a line of a given wavelength can be distinctly separated from a line of an adjacent wavelength. The width of a spectral resolution element is typically defined as the full width at half maximum of the spectral line from a single wavelength.

The elements in the spectrograph, including the light source (i.e., the cell for containing the sample in the case for which the sample is the light source) or slit, the collimating lens unit, the diffraction grating, the focusing lens unit, and the light detector, can be mounted on a support. The dimensions (including the linear dimension) and the material of construction of the support can be selected such that the support has a thermal expansion (or contraction) amount that compensates for the changes of focal lengths of the lens with temperature. In this way, the spectrograph is thermally stable, i.e., will not have a large amount of undesirable change in performance with change in temperature. The range of temperature in which this can be done is generally about 20° C. to about 50° C.

Determination of the Curves of the Aspheric Lenses

The detailed determination of the curves of the surfaces on the lenses, including aspheric curves, and the best tilt for the detector array, can be done with a computer-aided lens design program which minimizes the sum of the squares of specified image errors. The image errors consist of transverse deviations of rays, at the array detector, in the plane containing the axes of both lenses. A sufficient number of rays, at appropriate spacings on the lenses, must be used in this process in order to determine the aspheric curves. Such rays are traced for wavelengths which provide images at several locations, approximately evenly spaced, on the detector array.

Selection of parameters in this example are based on specific requirements or wants and convenience. The following example is provided as for illustration. A CCD detector with a length of 9.728 mm was used. Due to normal manufacturing variations, a linear dispersion of 8.8 mm for wavelengths from 675 nm to 855 nm was chosen, at least 40 resolution elements are needed, with a slit size up to 0.122 mm. The CCD detector height is 0.608 mm and maximum flux collection is desired. Due to space requirements for fitting and mounting of lenses, a diffraction grating is chosen to fulfil the conditions (1) and (2) shown below:

$$35° < \Theta_{central} < 45° \quad (1)$$

$$17° < (\Theta_{max} - \Theta_{min}) < 21° \quad (2)$$

where $\Theta_{central}$ is the angle of deviation of the diffracted axial ray for the central dispersed wavelength and $\Theta_{max}$ and $\Theta_{min}$ are angles of deviation for maximum and minimum wavelengths. $(\Theta_{max} - \Theta_{min})$ therefore the angular dispersion. This leads to choice of a standard 1200 groove per millimeter diffraction grating, with $\Theta_{central} = 40°$ and $(\Theta_{max} - \Theta_{min}) = 19°$.

In order to use the computer optimization process previously described, a starting design is necessary. An exact solution exists for a collimator lens which corrects spherical aberration, with a plane surface toward the focus and a convex aspheric surface toward the parallel light. The aspheric surface is an ellipsoid of revolution with eccentricity $$e = 1/n \quad (3)$$

and conic constant $$k = -e^2 = -1/n^2 \quad (4)$$

wherein n is the index of refraction (see below). This is used to specify the initial first lens, which is then modified slightly during optimization. (Kingslake, Rudolph "Lens Design Fundamentals", Academic Press, 1978, p. 113, the disclosure in which relating to aspheric lens design is incorporated by reference herein).

The starting design can use an equiconvex lens for the second lens. Initially, focal lengths are chosen equal for both lenses at f=25 mm. The lens radii are calculated from $$\bar{f} = (n-1)\left( \frac{1}{r_1} - \frac{1}{r_2} + \frac{t}{n} \frac{n-1}{r_1 r_2} \right) \quad (5)$$

where $r_1$, and $r_2$ are the vertex radii of curvature of the first and second surface respectively. A radius is positive if the center of the sphere is to the right of the vertex. For the flat surface on the first lens, terms involving $1/r_1$ are set to zero, t is the lens thickness and n is the index of refraction for the central wavelength (Kingslake, supra, p. 54), t is chosen to give a positive edge thickness.

At this stage of the design, computer optimization is started (Kingslake, supra ch. 16). The grating tilt is chosen to direct light of the central wavelength through the center of the second lens, using the diffraction grating equation (Richardson in Applied Optics and Optical Engineering, R. Kingslake, editor, Volume 5, p. 21, Academic Press, 1969).

$$m\lambda = d(\sin \alpha \pm \sin \beta) \quad (6)$$

where m is an integer, the diffraction order (m=1 for the invention), $\lambda$ is the wavelength of light in the same units as d, d is the separation of parallel grooves, $\alpha$ is the angle of incidence, and $\beta$ is the angle of diffraction. The plus sign is used when the incident and diffracted rays are on the same side of the normal to the grating surface, while the minus sign applies when they are on opposite sides. A merit function based on the algorithm of Forbes for ray selection (G. W. Forbes, J. Opt. Soc. Am. (A), 5, 1943–1956 (1988), which is incorporated by reference herein) is used. Due to the use of an aspheric surface on the second lens, a large number of radial sampling rings, $N_r = 8$, is needed. The automatic generation feature for merit functions available in most optical design programs can be used. Transverse aberrations in the plane containing the axes of both lenses are kept. Transverse aberrations out of this plane are not used. This choice results in the smallest image spread in the plane at the expense of acceptable light loss off the narrow dimension of the CCD detector. For merit function generation, wavelengths of 0.675, 0.720, 0.765, 0.810 and 0.855 micrometers, and object points at the center of the source and out of the plane containing both lens axes, by 0.304 mm, are used. Additional terms must be added to the merit function. The deviation of the axial rays at 0.675 and 0.855 micrometers from the desired end of the spectrum at ±4.4 mm from the axial point on the detector must be used to obtain the desired linear dispersion of 8.8 mm. The angle to the lens axis of the ray at 0.765 nm and 0.8 fractional aperture in the space after the first lens must be controlled to zero, to ensure collimation of light. These are the minimum terms needed in the merit function to complete a satisfactory design. The weights assigned to these additional terms can be determined by a few trials and evaluations in order to guide the design process. The aberrations are balanced for best resolution at the wavelength of 733 nm.

In the earliest stages of the design, variables include the vertex radii of curvature, for both lenses, the conic constant of the second surface of the first lens, tilt of the diffraction grating about an axis perpendicular to both lens axes and through their intersection point, separation of the detector from the second lens, and the tilt of the detector around an axis perpendicular to the plane containing both lens axes and through the intersection point of the detector and the second lens axis.

After initial optimization, a general aspheric surface defined by $$z = \frac{r^2/R}{1+\left(1-\left(\frac{r}{R}\right)^2\right)^{0.5}} + AD\, r^4 + AE\, r^6 + AF\, r^8 + AG\, r^{10} \quad (7)$$

where R is the vertex radius of curvature and r is the radial distance from the lens axis, is added to the first surface of the second lens. The parameters R and the aspheric coefficients AD, AE, AF and AG are now allowed to vary during optimization. Next the separations of both lenses from the diffraction grating are allowed to vary, where these separations are constrained to be equal. This is the final optimization, where the best balance between power of the second lens and the benefit from spreading the light of different colors across the aspheric surface of the second lens, is found. A final adjustment of the radii of all lens surfaces, the conic constant of the second surface of the first lens, the aspheric coefficients of the first surface of the second lens, and the tilts of the diffraction grating and detector occur during this final optimization. Although variation of other parameters can be explored during the design, these parameters are preferably fixed during the final optimization to obtain desired packaging of the spectrograph and lens thicknesses suitable for manufacturing.

The preferred embodiment of FIG. 2 has the optical elements as specified in Table 1. It is designed to cover the spectral range from 675 nm to 855 nm, with f/1.2 light collection and a linear dispersion for the spectrum on the detector of 8.8 mm. Materials of the lenses are optical glasses from Schott Glass Technologies, Inc. The optical prescription uses the conventions and terminology of the OSLO 3 optical design program from Sinclair Optics, Inc. (OSLO Series 2 and 3 Operating Manual, First Edition, Sinclair Optics, Inc., 1991, Ch. 3, which description relating to the design of aspheric lens and the conventions of Table I is incorporated by reference herein). The location of the window 226 is arbitrary, provided it is between the focusing lens 224 and the detector 230. The lenses have been fabricated by Optische Werke G. Rodenstock of München, FRG. The embodiment described by Table 1 is given as an illustration of the present invention only and is not to be interpreted as a limitation. A skilled worker in the art will be able to make similar embodiments.

the spectrograph. "Radius" represents the vertex radius (in mm) of curvature of the optical element associated with a particular surface number. A negative number indicates that the center of curvature of the optical surface is to the left of its vertex wherein light travels from left to right. "Thickness" represents the distance of separation (in mm) from the surface represent by a specific S# to the next surface. A negative number indicates a change of direction of the light to a generally opposite direction. In this embodiment, this is caused by the reflective diffraction grating. "Diameter" represents the diameter of the component associated with a particular surface number. "Material" shows the material of construction of an optical element. F2 is optical glass with a refractive index of 1.62004 for a wavelength of 587.6 nm and an Abbe number of 36.37. BK7 is optical glass with refractive index of 1.5168 for a wavelength of 587.6 nm and an Abbe number of 64.17.

Referring to Table 1, the light source has a diameter of 0.608 mm and is about 24 mm from the collimating lens having S# of 2. The collimating lens has an aspheric surface facing the grating which has S# of 6. The collimating lens's aspheric surface has a conic constant of about −0.454 (indicating an ellipsoidal surface). An aperture stop interposes between the collimating lens and the grating and contacts the grating surface (since there is no thickness between S# of 4 and S# of 6). A tilt of about−9.63° at S# of 5 represents a change of coordinate system indicating the grating being tilted with respect to the collimated beam. The convention used is common to all optical design programs and is described in OSLO supra, p. 3–27. Rotations of a local coordinate system, with origin at the vertex of a given surface, are about an axis perpendicular to and into the plane of FIGS. 1 and 2. The sense of the rotation is given by a left hand rule. If the thumb of a left hand points along the axis into the plane of the figure, the curled fingers point in a positive direction. The tilt at surface 7 reorients the coordinates to the original direction. The tilt at surface 8 orients the coordinates at 40 degrees to the original direction so that the focusing aspheric lens can be defined. S#'s of 10 and 11 represent the surfaces of the focusing aspheric lens for focusing diffracted light to a detector (which is prepresented by S# of 14). The surface (S# of 10) facing the grating is aspheric having aspheric coefficients AD, AE, AF, AG as shown in Table 1. Surfaces S# of 12 and S# of 13 are associated with a window protecting the detector. The

TABLE 1

| S# | Radius | Thickness | Diameter | Material | Notes |
| --- | --- | --- | --- | --- | --- |
| 1 |  | 24.04169 | 0.608 |  | Light Source |
| 2 | −63.32300 | 8.500000 | 25.00 | F2 |  |
| 3 | −14.80086 | 42.07296 | 25.00 |  | Asphere, Conic Constant = −0.45395 |
| 4 |  |  | 22.00 |  | Aperture Stop |
| 5 |  |  |  |  | Tilt −9.63621° |
| 6 |  |  | 30.00 |  | Diffraction Grating, 1200 grooves/mm |
| 7 |  |  |  |  | Tilt 9.63621° |
| 8 |  |  |  |  | Tilt 40.0000° |
| 9 |  | −42.07296 |  |  |  |
| 10 | −21.79855 | −11.00000 | 30.00 | F2 | Asphere, see * below |
| 11 | 45.31600 | −8.32212 | 30.00 |  |  |
| 12 |  | −0.92468 | 25.00 | BK7 | Window |
| 13 |  | −10.52461 | 25.00 |  |  |
| 14 |  |  |  |  | Detector, Tilt −1.47070° |

* For S# = 10, Aspheric coefficients: AD = 1.9396E-05, AE = 6.8114E-09, AF = 7.8515E-11, AG = −1.4850E-14

In Table 1, "S#" represents the surface numbers of the components (including optical elements such as lenses) in detector, having a surface S# of 14, is tilted with respect to the optical axis of the focusing lens such that the normal to surface S# of 6 deviates about 1.47° to the optical axis of the focusing lens. The negative sign of the tilt conforms to the lea-hand rule convention as describe for surface #5.

The spectrographs of the present invention will provide better imaging quality than prior art devices. For comparison, consider for example, a device such as that of Tedesco et. al. Details on optical prescription are not provided by U.S. Pat. No. 5,011,284 (Tedesco et al.) to enable a ray trace analysis similar to the one presented for the invention. However, from FIG. 1 of Tedesco, it can be determined that the magnification is approximately 10×. Flux collection for Tedesco is given as f/0.6. For flux collection comparable to the above-described present invention, which collects at f/1.2, the slit or source could have one-half the linear dimension of that for the invention. So, with the 10×magnification in a device like Tedesco's and the half-size slit, the final image would be five times larger, to first order. The final image in the invention, including both magnification and aberration, is an average of 1.54 times larger than the slit. The net difference, for comparable flux collection, is (5/1.54)=3.25 times increase in image linear dimension for Tedesco. The increase in detector area required is 10.6, and noise, which varies as the square root of the detector area, increases by 3.25 times.

The angle through which light is dispersed in Tedesco is about 3.3 degrees, compared to 19 degrees for the present invention. Without ray-trace data for Tedesco, due to lack of an optical specification, a complete comparison of the number of resolution elements is not possible. However, if 60 resolution elements fit into 19 degrees in the present invention, and Tedesco uses about 3.3 degrees, with a 3.25 magnification difference with respect to the invention, the number of resolution elements in Tedesco, with respect to equivalent flux collection in the invention, would be $$60 \left( \frac{3.3}{19} \right) \left( \frac{1}{3.25} \right) = 3.2$$

resolution elements.

Thus, for comparable flux collection, the present invention has a clear advantage in lower detector noise and a larger number of possible resolution elements than prior art devices with performance similar to that of Tedesco et. al. Further, a spectrograph (such as the Tedesco et. al. device) that uses a holographic optical element can only diffract S polarized light efficiently. The spectrograph of the present invention, which uses a blazed diffraction grating, can diffract both S and P polarized light efficiently. This is an advantage of up to 2 times in efficiency for applications where the source emits unpolarized light. The image quality of the invention and its ability to separate light of different wavelengths is presented in FIG. 3 through FIG. 7.

Figure 3:
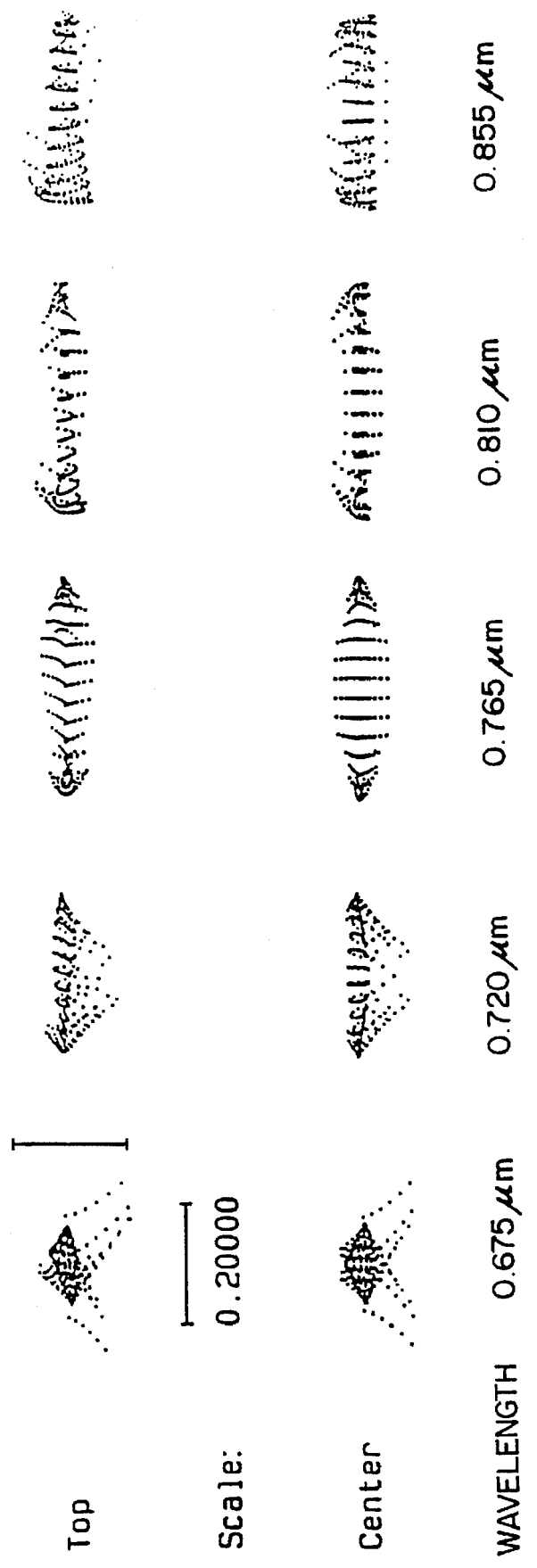
FIG. 3 shows spot diagrams for a spectrograph of the present invention for five different wavelengths, including the minimum and maximum wavelengths, for the top and center of the slit. The spot diagrams for the bottom of the slit are mirror images of the corresponding spot diagrams for the top of the slit, mirrored right to left. Spot diagrams are images, on the detector, of a point on the slit, represented by the intersections on the detector of a regular grid of rays through the first lens.

FIG. 3 shows spot diagrams for five wavelengths from the minimum to the maximum wavelength (for the top and center of a slit) for a spectrograph of the present invention. A spot diagram is produced for a given wavelength by tracing rays from a single point on the source, using a regular array of aiming points at the limiting aperture for transmitted light (at the diffraction grating in the invention), and continuing the rays to the detector.

In an analogy to graphic art, the spot diagram is a brush used to render a likeness (the image) of a subject (the slit, for example). The rendering is limited by the brush size. In FIG. 3, the vertical dimension of the spot diagram cores is about 0.05 mm for all wavelengths. The vertical dimension is in the plane containing the axes of both lenses in the spectrograph, so, the 0.05 mm dimension means that the image of the slit or source formed by the spectrograph optics is broadened by aberrations by about 0.05 mm.

Figure 4:
FIG. 4 shows images at the detector for a spectrograph of the present invention, of a 0.094 mm wide by 0.608 mm high slit for 5 wavelengths. The images are generated by tracing rays from random points on the slit to random points on the limiting aperture at the diffraction grating and then on to the detector.

FIG. 4 shows slit image diagrams for 5 wavelengths from the minimum to the maximum wavelength. The slit is 0.094 mm wide by 0.608 high and represents the narrowest slit expected in our application. Each diagram is produced by tracing rays from random points on the slit to random points on the limiting aperture and on to the detector. The diagram is a visualization of the slit's image on the detector. Most of the increase in image size is due to grating magnification, which increases with increasing wavelength, rather than aberrations of the lenses.

Figure 5:
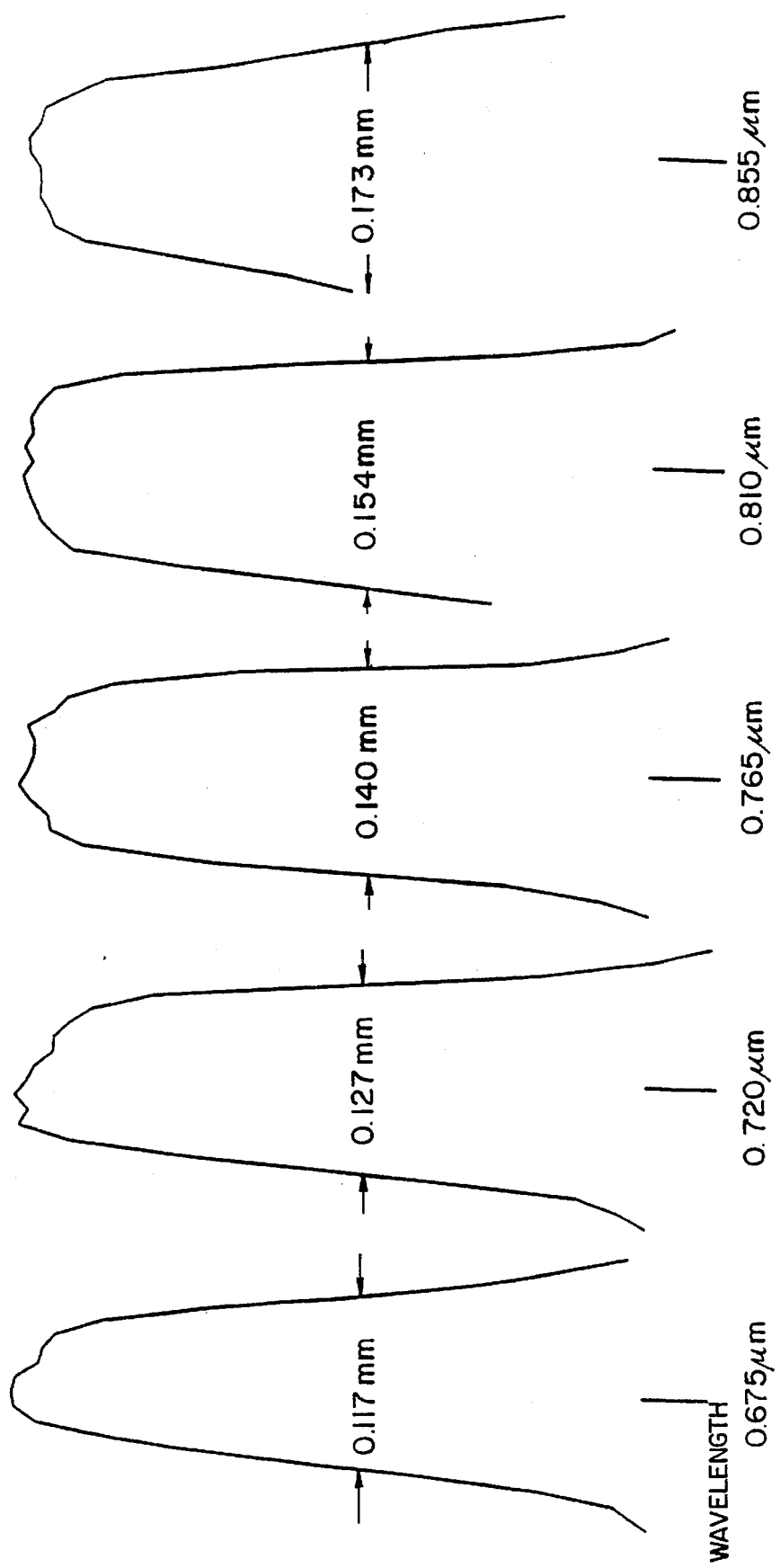
FIG. 5 shows spectral lines, at the detector for the spectrograph of FIG. 4, for a 0.094 mm wide by 0.608 mm high slit for 5 wavelengths. The spectral lines are generated from ray tracing as described for FIG. 4.

FIG. 5 shows resolution plots for 5 wavelengths from the minimum to the maximum wavelength, for a slit that is 0.094 mm wide by 0.608 high. The plots are generated by taking corresponding slit image diagrams and summing the rays which fall into equal small segments of the detector. The resolution plots accurately represent spectral line widths that are observed in measurements with a spectrograph. For this narrowest slit size, there are over 60 resolution elements across the spectrum.

Figure 6:
FIG. 6 shows images at the detector for a spectragraph of the present invention, of a 0.122 mm wide by 0.608 mm high slit for 5 wavelengths, generated as described for FIG. 4.

FIG. 6 is a slit image diagram, similar to FIG. 4, for a 0.122 mm wide by 0.608 mm high slit, representing the widest slit expected in our application.

Figure 7:
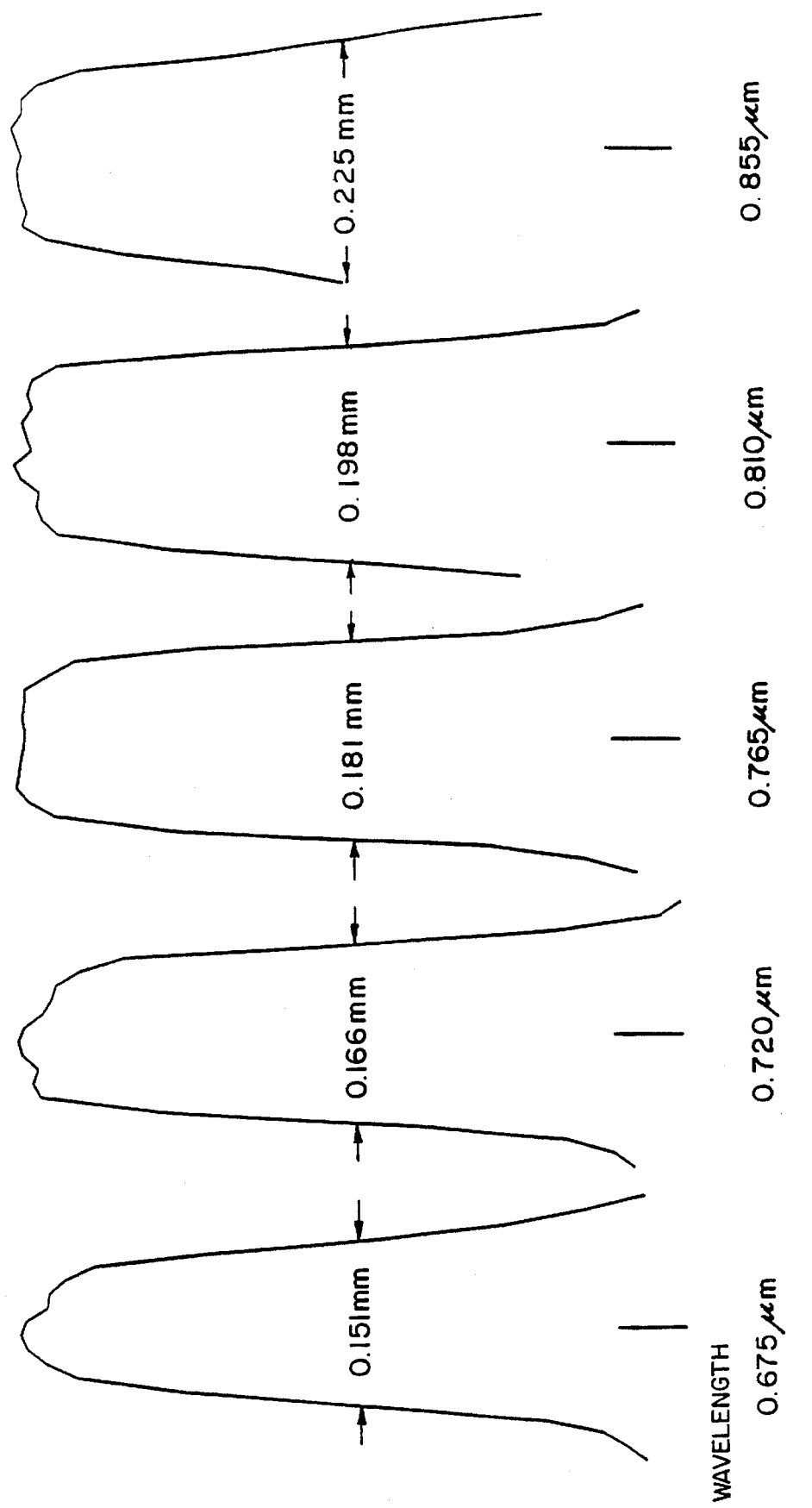
FIG. 7 shows spectral lines, at the detector for the spectrograph of FIG. 6, for a 0.122 mm wide by 0.608 mm high slit for 5 wavelengths, generated as described for FIG. 5.

FIG. 7 shows resolution plots, similar to FIG. 5, for a 0.122 mm wide by 0.608 mm high slit. For this widest slit size, there are over 46 resolution elements. This exceeds our requirement of a minimum of 40 resolution elements.

FIGS. 3 to 7 show the advantageous application of the present invention in obtaining high quality images. In comparison, a conventional spectrograph with concave diffraction grating in a similar application (similar slit size, detector size, wavelength range, etc.) having 40 resolution elements will have a focal ratio of f/2.3 or more.

Although the illustrative embodiments of the spectrograph of the present invention have been described in detail, it is to be understood that the above-described embodiments can be modified by one skilled in the art, especially in sizes and shapes and combination of various described features without departing from the spirit and scope of the invention. For example, the planar reflection diffraction grating can be replaced with other suitable diffracting gratings. The collimating lens and the focusing lenses can each be combinations of groups of lenses. Further, the spectrograph's application is not limited to Raman scattered light analysis. It can be used to analyze light from any light source, as long as the optical elements and the detector are selected for the proper wavelengths.

What is claimed is:

1. A spectrograph for analyzing lights of wavelengths of interest, comprising:
   (a) a first lens unit having at least one lens with at least one aspheric surface for collimating light from a light source, the first lens unit having a positive optical power and having a focal ratio of at most 1.7;
   (b) a reflective diffraction grating for diffracting the collimated light from the first lens unit;
   (c) a light detector; and
   (d) a second lens unit having at least one lens with at least one aspheric surface for focusing the diffracted light on the light detector, the second lens unit having a focal length sufficient to provide an overall magnification of 0.8 to 2.0 on the light detector for said light source.

2. The spectrograph of claim 1 wherein the focal ratio of the first lens unit is from 1.0 to 1.7.

3. The spectrograph of claim 1 wherein the diffracted light is in the form of a beam and the diffraction grating is separated from the second lens unit by a distance sufficient for the diffracted light beam with light of various wavelengths to spread in its narrow dimension to a size of 1.5 to 3 times the size of light beam off the grating when impinging on the second lens unit.

4. The spectrograph of claim 1 wherein the first lens unit consists of a single optical element with at least one aspheric surface and collimates the light of a specific wavelength from the light source to a parallel beam.

5. The spectrograph of claim 1 wherein the diffraction grating is a planar reflective diffraction grating having a planar optical surface consisting of straight parallel equally-spaced grooves.

6. The spectrograph of claim 1 wherein the second lens unit consists of a single optical element with at least one aspheric surface and focuses the diffracted light of different wavelengths to form spatially separated, distinct, compact images of the source on the light detector.

7. The spectrograph of claim 6 wherein the second lens unit consists of a single optical element with at least one aspheric, nonellipsoidal, nonhyperboloidal, nonparaboloidal surface.

8. The spectrograph of claim 1 wherein the light detector has a planar array tilted with respect to the optical axis of the second lens unit.

9. The spectrograph of claim 1 further comprising a structure supporting the first lens unit and the second lens unit such and wherein the lenses are constructed of a material such that the change in focal lengths of the lenses with temperature are compensated by the change in linear dimensions of the structure.

10. The spectrograph of claim 1 wherein the first lens unit is one optical element with one or more aspheric surfaces, the second lens unit is one optical element with one or more aspheric surfaces, the first lens unit rendering light of a specific wavelength from the center of the light source substantially parallel to impinge on the diffraction grating, the second lens unit focusing the diffracted light from the diffraction grating into spatially separated, distinct, compact images of the light source for light of different wavelengths on the detector.

11. The spectrograph of claim 1 further comprising a laser for illuminating a sample to emit Raman scattered light, said Raman scattering sample being the light source emitting light to be collimated by the first lens unit.

12. A spectrograph for analyzing a spectrum having a plurality of wavelengths of interest, comprising:
(a) a first lens unit composed of a single lens with at least one ellipsoidal surface for collimating light from a light source, the first lens unit having a positive optical power and having a focal ratio of 1.0 to 1.7;
(b) a planar, reflective diffraction grating for diffracting the collimated light from the first lens unit;
(c) a light detector; and
(d) a second lens unit composed of a single lens with at least one nonellipsoidal, nonparaboloidal, aspheric surface facing the diffracting grating for focusing the diffracted light on the light detector, the second lens unit having a focal length sufficient to provide an overall magnification of 0.8 to 2.0 on the light detector for light of the wavelengths of interest, wherein the diffraction grating is separated from the second lens unit by a distance sufficient for a beam of diffracted light of various wavelengths to spread in its narrow dimension to a size of 1.5 to 3 times the size of the light beam off the grating when impinging on the second lens unit.

13. A method of analyzing light from a light source, comprising:
(a) collimating light from the light source by a first lens unit having at least one optical element with at least one aspheric surface, the first lens unit having a positive optical power and having a focal ratio of at most 1.7;
(b) diffracting the collimated light from the first lens unit with a diffraction grating; and
(c) focusing onto a light detector the diffracted light from the diffraction grating with a second lens unit having at least one optical element with at least one aspheric surface, the second lens unit having a focal length that provides an overall magnification when combined with the first lens unit of 0.8 to 2.0 for said light source.

14. The method of claim 13 wherein the second lens unit has a center and focuses the diffracted light about the center in a nonsymmetrical fashion.

15. The method of claim 13 further comprising illuminating an analytical sample with a laser beam to cause the sample to emit Raman scattered light, said Raman scattering sample being the light source emitting light to be collimated by the first lens unit.

16. The method of claim 13 further comprising tilting a planar array of the light detector with respect to the optical axis of the second lens unit.

17. A method of making a spectrograph for analyzing light from a light source, comprising:
(a) mounting on a support a collimating lens unit having a focal ratio of 1.7 or less in a position relative to the light source such that light emitted from the light source is collimated to a generally parallel beam, said lens unit having at least one lens with at least one aspheric surface;
(b) mounting on the support a planar diffraction grating in a position to diffract the collimated light beam such that the first order diffracted light forms an acute angle with the collimated beam;
(c) mounting on the support a focusing lens unit in a position to focus the first order diffracted light, said focusing lens unit having at least one lens with at least one aspheric surface; and
(d) mounting on the support a planar light detector such that the normal of the plane of the light detector forms an acute angle with the optical axis of the focusing lens to obtain distinct, compact images of the light source in different wavelengths on the light detector, the focusing lens unit having a focal length that provides an overall magnification on the detector of 0.8 to 2.0 for said light source.

18. The method of claim 17 wherein the method is for analyzing spectra having a plurality of wavelengths of interest and wherein the diffraction grating is separated from the focusing lens unit by a distance sufficient for a diffracted light of various wavelengths to spread in its narrow dimension to a size of 1.5 to 3 times the size of light beam off the grating when impinging on the focusing lens unit.

19. The method of claim 17 wherein the collimating lens unit consists of a single lens with at least one ellipsoidal surface and the focusing lens unit consists of a single lens with at least one aspheric, nonellipsoidal, nonhyperboloidal, nonparaboloidal surface.

* * * * *